US007523560B2

(12) United States Patent
Chang et al.

(10) Patent No.: US 7,523,560 B2
(45) Date of Patent: Apr. 28, 2009

(54) METHOD AND APPARATUS FOR DETECTING AN ELECTRONIC PRODUCT BEING PLACED VERTICALLY OF HORIZONTALLY

(75) Inventors: Ling-Chen Chang, Hsinchu (TW); Cheng-Yao Liao, Hsinchu (TW)

(73) Assignee: Lite-On It Corporation, Taipei (TW)

(*) Notice: Subject to any disclaimer, the term of this patent is extended or adjusted under 35 U.S.C. 154(b) by 660 days.

(21) Appl. No.: 11/028,544

(22) Filed: Jan. 5, 2005

(65) Prior Publication Data

US 2005/0155048 A1 Jul. 14, 2005

(30) Foreign Application Priority Data

Jan. 8, 2004 (TW) .............................. 93100457 A

(51) Int. Cl.
*G01C 9/06* (2006.01)

(52) U.S. Cl. .................................................. 33/366.11

(58) Field of Classification Search ................... 33/281, 33/282, 283, 285, 366.11, 366.24, 366.26
See application file for complete search history.

(56) References Cited

U.S. PATENT DOCUMENTS 2,600,363 A * 6/1952 Morris .................... 33/366.24
3,079,697 A * 3/1963 Lunde ...................... 33/366.24
3,975,831 A * 8/1976 Jysky et al. .............. 33/366.12
2004/0187329 A1* 9/2004 Saigh et al. .............. 33/366.24
2007/0214667 A1* 9/2007 Lin ......................... 33/366.11
2007/0268480 A1* 11/2007 Kaye ....................... 33/366.11

* cited by examiner

*Primary Examiner*—G. Bradley Bennett
(74) *Attorney, Agent, or Firm*—Muncy, Geissler, Olds & Lowe, PLLC

(57) ABSTRACT

An apparatus for detecting an electronic product whether being placed vertically or horizontally, includes a fixed support member connected to a constraint base at an anchor point, a cantilever having a first end connected to the fixed support member so as to be approximately parallel with the constraint base, and a counterweight mounted on a second end of the cantilever in order to provide a force thereof. A sensing device converts bending of the cantilever into a circuitry status. When the cantilever extends in a direction approximately perpendicular to a gravity line defined by the counterweight, the sensing device converts the distortion of the cantilever into a first circuitry status. When the cantilever extends in a direction approximately parallel to the gravity line, the sensing device converts the distortion of the cantilever into a second circuitry status different from the first circuitry status.

18 Claims, 5 Drawing Sheets

METHOD AND APPARATUS FOR DETECTING AN ELECTRONIC PRODUCT BEING PLACED VERTICALLY OF HORIZONTALLY

FIELD OF THE INVENTION

The invention relates to a method and apparatus, more particularly to the method and apparatus for detecting an electronic product being placed vertically or horizontally.

BACKGROUND OF THE INVENTION

Due to rapid advance of computer technology and the prevalence of multimedia, the optical disks become more and more important medium for backing up data and information exchange because the former have many advantages including a high storage capacity, easy to handle, and a long preserving time for the stored data. An optical disk drive for operating the disk also becomes more popular for this reason. Presently, most of the desktop computers and notebook computers are provided with at least one disk drive for operating the optical disk. In addition, the disk drive is also employed in many other electronic products, such as DVD player and like.

Conventionally, the disk drive is disposed horizontally in an electronic product. When the disk drive is disposed horizontally, the inserted disk extends perpendicularly to a gravity line. Nevertheless, in recent years, the disk drive in the electronic product is disposed vertically due to its special utility and external appearance. When the disk drive is disposed vertically, the inserted disk extends in a direction parallel with the gravity line. Accordingly, the angle between the rotational axis of a spindle motor and the gravity line can affect the maximum driving force and the balance of the spindle motor. Therefore, varying positions of the disk drive in the electronic product can result in unstable rotation and vibration of the spindle motors. To eliminate the aforesaid unstable rotation problem, an auto-balance system is generally employed so as to lower the vibration of the electronic product, thereby providing a stable balance during the accessing and the track-following operation thereof. Besides, for some other electronic products, the latter can achieve better performance by adjusting their position with respect to the gravity line, such as by turning the display of an LCD device into 90° from its initial position can provide another format of preferred user's interface.

In the past, in order to detect whether the disk drive is assembled vertically or horizontally within an electronic product, the status of _ servo of the pick-up head is computed since the received reflected power can be affected due to the posture of the disk drive. For example, if the disk drive is disposed horizontally, the focusing servo has to provide more current to compensate the weight of the pick-up head. On the other hand, the focusing servo does not have to provide the additional driving current if the drive is disposed vertically. Thus, many logical operation processes and computing data are required to detect the position of the disk drive in the electronic product. Alternately, several complicated mechanical device and electronic switches or specific sensing device must be employed in order to define the gravity direction of the disk drive, thereby complicating the position detecting system.

SUMMARY OF THE INVENTION

The object of the present invention is to provide a method and apparatus which is used for detecting whether an electronic product being placed vertically or horizontally and which includes a sensing device capable of converting distortion of a cantilever into circuitry status so as to indicate the precise placement of disk drive in the electronic product.

In one aspect of the present invention, an apparatus for detecting whether an electronic product being placed vertically or horizontally is provided and includes: a constraint base; a fixed support member connected to the constraint base at an anchor point and extending upwardly from the constraint base; a cantilever disposed approximately parallel to the constraint base, and having a first end connected to the fixed support member and a second end opposite to the first end; a counterweight mounted on the second end of the cantilever in order to provide a force thereof, the counterweight defining a gravity line by virtue of ground gravity; and a sensing device for converting bending of the cantilever into a circuitry status. When the cantilever extends in a direction approximately perpendicular to the gravity line, the sensing device converts the distortion of the cantilever into a first circuitry status. When the cantilever extends in a direction approximately parallel to the gravity line, the sensing device converts the distortion of the cantilever into a second circuitry status different from the first circuitry status.

In another aspect of the present invention, a circuit chip assembly for detecting whether an electronic product being placed vertically or horizontally is provided and includes: a base plate; and a cantilever module mounted on the base plate and including a fixed support member connected to the base plate at an anchor point and extending upwardly from the base plate, a cantilever disposed approximately parallel to the base plate and having a first end connected integrally to the fixed support member and a second end opposite to the first end, a counterweight mounted on the second end of the cantilever in order to provide a force thereof, the counterweight defining a gravity line by virtue of ground gravity, and a sensing device for converting bending of the cantilever into a circuitry status. When the cantilever extends in a direction approximately perpendicular to the gravity line, the sensing device converts distortion of the cantilever into a first circuitry status. When the cantilever extends in a direction approximately parallel to the gravity line, the sensing device converts distortion of the cantilever into a second circuitry status different from the first circuitry status.

In still another aspect of the present invention, a method for detecting whether an electronic product being placed vertically or horizontally by utilizing a sensing device is provided. The sensing device is capable of converting the distortion of a cantilever module into first and second circuitry statuses. The cantilever module includes a constraint base and a cantilever mounted on the constraint base. The method includes the steps of: detecting a circuitry status provided by the sensing device; and checking out if detected circuitry status is the first or the second circuitry status. When the first circuitry status is detected, the electronic product is currently placed horizontally; when the second circuitry status is detected, the electronic product is currently placed vertically

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENTS

Figure 1:
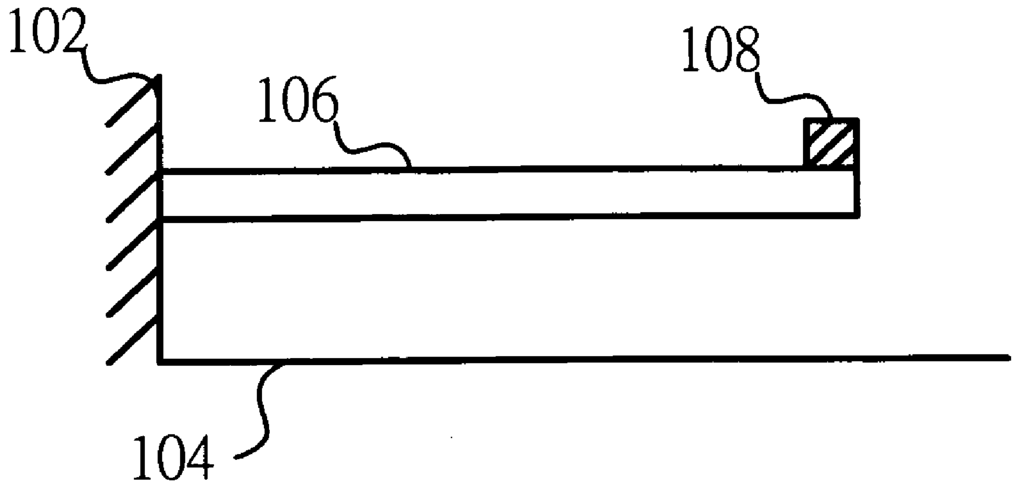
FIG. 1 shows a cantilever module employed in the apparatus of the present invention for determining an electronic product being placed vertically or horizontally.

FIG. 1 shows a cantilever module used in an apparatus according to the present invention for detecting whether an electronic product being placed vertically or horizontally. As illustrated, the cantilever module includes a constraint base 104, a fixed support member 102, a cantilever 106, and a counterweight 108. The fixed support member 102 is connected to the constraint base 104 at an anchor point, and extends upwardly from the constraint base 104. The cantilever 106 is disposed parallel to the constraint base 104, and has a first end connected to the fixed support member 102 and a second end opposite to the first end. The counterweight 108 is mounted on the second end of the cantilever 106 in order to provide a force for bending the cantilever 106. The counterweight 108 further defines a gravity line by virtue of ground gravity.

Figure 2:
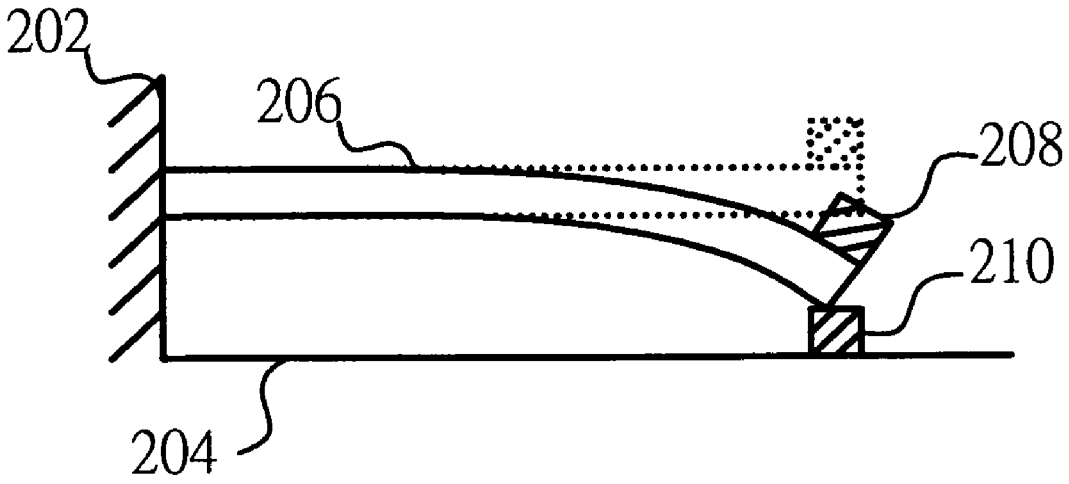
FIG. 2 shows how a cantilever of the cantilever module employed in the apparatus of the present invention bends with respect to a gravity line when of the cantilever module is disposed in a horizontal position.

FIG. 2 shows a cantilever module used in the apparatus according to the present invention for detecting whether the electronic product being placed vertically or horizontally. The cantilever module is placed horizontally, and includes a constraint base 204, a fixed support member 202 connected to the constraint base 204 at an anchor point and extending upwardly from the constraint base 204, a cantilever 206 disposed approximately parallel to the constraint base 204 and having a first end connected to the fixed support member 202 and a second end opposite to the first end; and a counterweight 208 mounted on the second end of the cantilever 206 in order to provide counterbalance thereof. An electronic contact 210 is mounted on the constraint base 204 in alignment with the counterweight 208 for detecting position of the cantilever 206 with respect to the gravity line. The electrical contact 210 is able to convert distortion of the cantilever 206 into a circuitry status. For example, the electrical contact 210 exhibits a first circuitry status such as a short circuit causing by the contact of the second end of the cantilever 206 and the electrical contact 210 due to bending of the cantilever 206. Otherwise the electrical contact 210 exhibits a second circuitry status such as an open circuit when the second end of the cantilever 206 is spaced apart from the electrical contact 210. By making an appropriate adjustment to the load of the counterweight 208, the material of the cantilever 206 or amending the geometric cross-section of the cantilever 206, the first circuitry status will be generated when the cantilever module is placed horizontally since the second end of the cantilever 206 contacts the electrical contact 210 due to bending of the cantilever 206.

Figure 3:
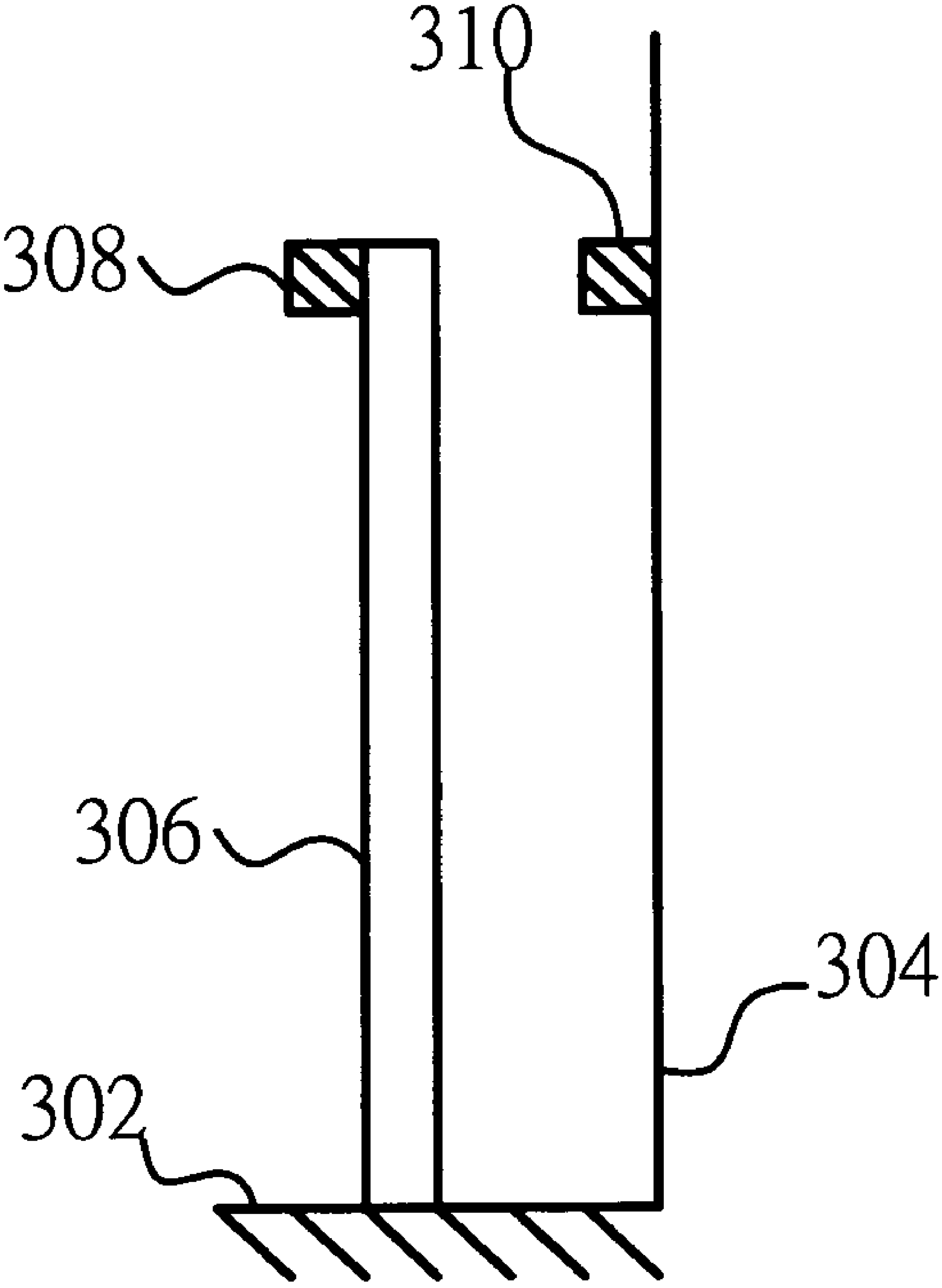
FIG. 3 shows the cantilever module employed in the apparatus of the present invention when the former is disposed in a vertical position.

FIG. 3 shows a cantilever module used in the apparatus according to the present invention for detecting whether the electronic product being placed vertically or horizontally. In contrast to FIG. 2, the cantilever module in FIG. 3 is placed vertically. Since the cantilever 306 performs buckling behaviors while placed vertically, the contact between the second end and the electrical contact 310 to generate the first circuitry status is potentially possible. In order to prevent generation of incorrect circuitry status, appropriate adjustment to the load of the counterweight 308, the material of the cantilever 306 or amending the geometric cross-section of the cantilever 306 are done so as to stabilize the buckling behavior of the cantilever 306, thereby generating the second circuitry status to able the user for discerning that the electronic product being placed vertically in FIG. 3 or being placed horizontally as shown in FIG. 2.

Figure 4:
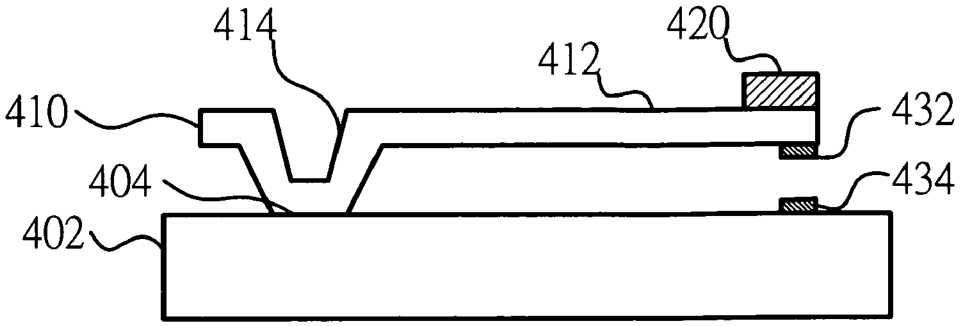
FIG. 4 is a first embodiment of the apparatus according to the present invention for detecting whether an electronic product being placed vertically or horizontally.

Furthermore, most of the electronic products produced lately are provided with at least one integrated circuit chip. Thus, the cantilever module as shown in FIGS. 2 and 3 can be integrated into the circuit chip by utilizing MEMS (micro electromechanical system) technology, thereby forming an integrated circuit chip assembly. Referring to FIG. 4, a first embodiment of the apparatus according the present invention is shown for detecting whether an electronic product is placed vertically or horizontally. The apparatus includes a base plate 402 and a cantilever module 410 mounted on the base plate 402. The cantilever module 410 includes a fixed support member 414, a cantilever 412, a counterweight 420, and a sensing device. The fixed support member 414 is connected to the base plate 402 at an anchor point 404, and extends upwardly from the base plate 402. The cantilever 412 is disposed approximately parallel to the base plate 402, and has a first end connected integrally to the fixed support member 414 and a second end opposite to the first end 414. The counterweight 420 is mounted on the second end of the cantilever 412 in order to provide a force for bending the cantilever 412, and defines a gravity line by virtue of ground gravity. The sensing device converts position of the cantilever 412 into a circuitry status. When the cantilever module 410 is disposed horizontally above the base plate 402, the cantilever 412 extends in a direction approximately perpendicular to the gravity line, and the sensing device converts the distortion of the cantilever 412 into a first circuitry status. When the cantilever module 410 is disposed vertically, the cantilever 412 extends in a direction approximately parallel to the gravity line, and the sensing device converts the distortion of the cantilever 412 into a second circuitry status different from the first circuitry status. Referring again to FIG. 4, the sensing device includes a first conductive member 432 mounted on one side of the cantilever facing the base plate 402, and a second conductive member 434 mounted on the base plate 402 in alignment with the first conductive member. The first circuitry status is generated when the first and second conductive members 432,434 contact each other (not shown). The second circuitry status is generated when the first and second conductive members 432,434 are spaced apart from each other (not shown).

Figure 5:
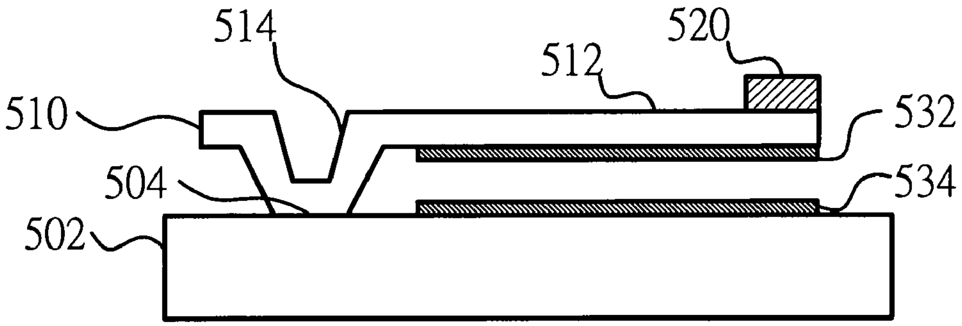
FIG. 5 is a second embodiment of the apparatus according to the present invention for detecting whether an electronic product being placed vertically or horizontally.

FIG. 5 shows a second embodiment of the apparatus according to the present invention, and has the structure similar to the first embodiment. Similar elements are renumbered from 402, 404, 410, 412, 414, and 420 into 502, 504, 510, 512, 514, and 520. The only difference resides in that the sensing device includes first and second conductive members 532, 534 that are respectively mounted on the cantilever 512 and the base plate 534 and that cooperatively define a capacitance therebetween. Under such arrangement, when a measured capacitance between the first and second conductive members 532, 534 is greater than a predetermined threshold of capacitance, the first circuitry status is generated; when a measured capacitance between the first and second conductive members is equivalent to or smaller than the predetermined threshold of capacitance, the second circuitry status is generated.

Figure 6:
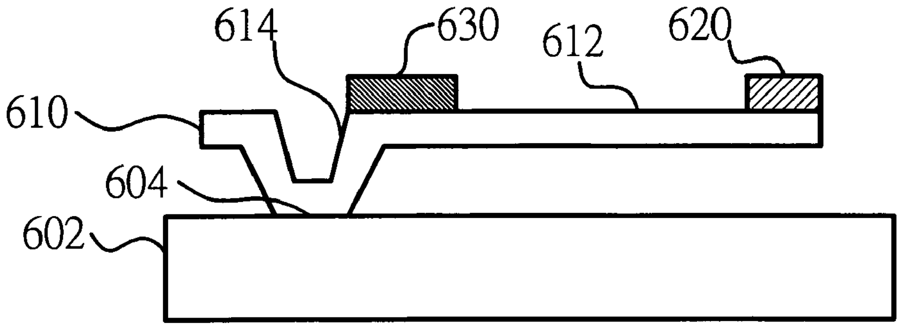
FIG. 6 is a third embodiment of the apparatus according to the present invention for detecting whether an electronic product being placed vertically or horizontally.

FIG. 6 shows a third embodiment of the apparatus according to the present invention, and has the structure similar to the first embodiment. Similar elements are renumbered from 402, 404, 410, 412, 414, and 420 into 602, 604, 610, 612, 614, and 620. The only difference resides in that the sensing device includes a piezo-resistor 630 mounted on the cantilever 612 for providing an initial resistance when no stress is applied thereto and another resistance when stress is applied thereto, thereby forming a resistant difference therebetween. Under such arrangement, when a measured resistant difference is greater than a predetermined threshold of resistant difference, the first circuitry status is defined; when a measured resistant difference is smaller than or is equivalent to the predetermined threshold of resistant difference, the second circuitry status is defined.

Figure 7:
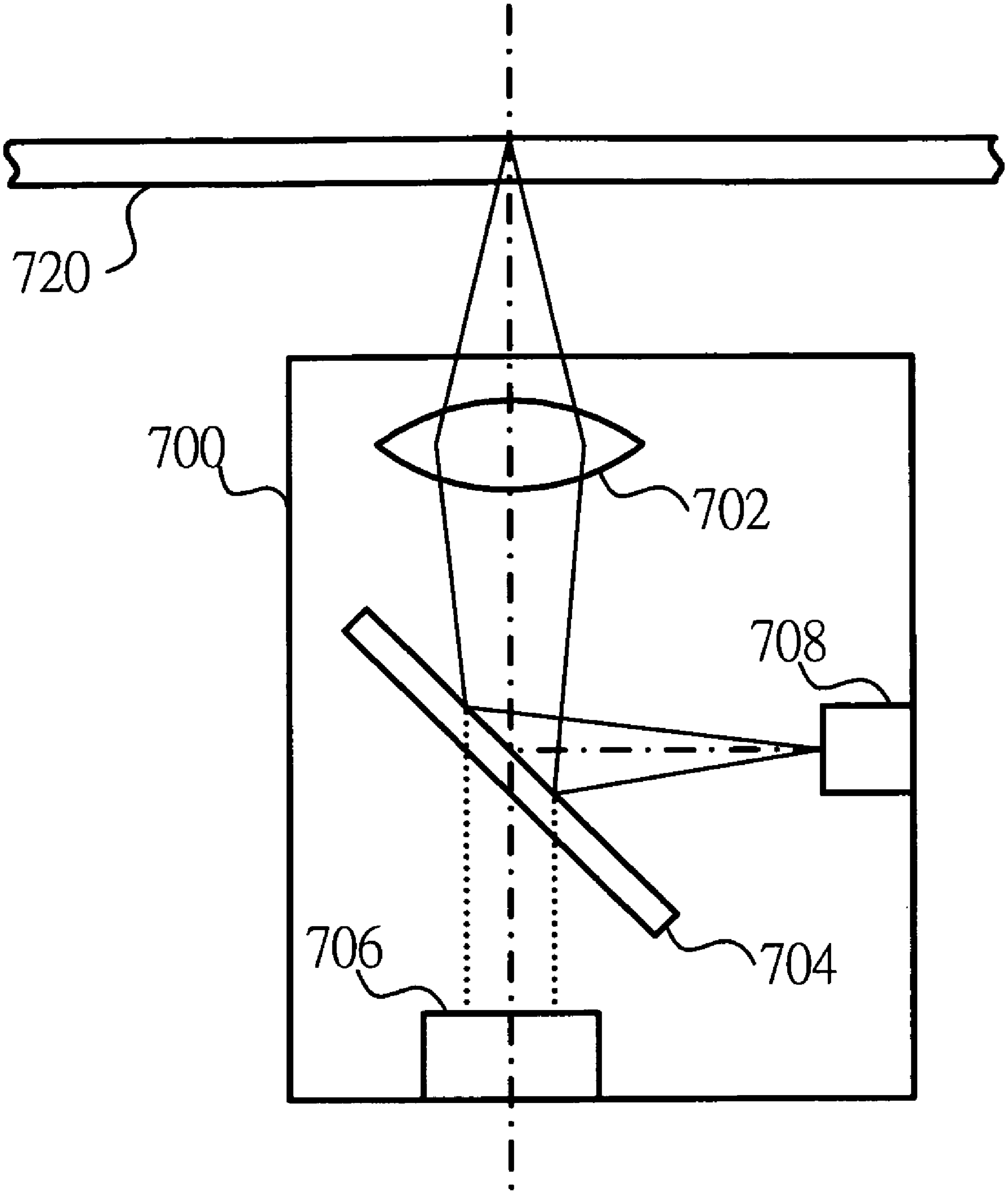
FIG. 7 illustrates a pick-up head of a disk drive and its relative position respect to an optical disk.

FIG. 7 illustrates a pick-up head 700 of a disk drive and its relative position respect to an optical disk 720. The pick-up head 700 includes a lens set 702, a laser diode 708, a beam splitter 704, and a photo detector 706, wherein the laser beams emitted by the laser diode 708 will be focused onto the track in the disk 720 via the lens set 702. The photo detector 706 detects the laser beams reflected from the disk 720 and split by the beam splitter 704. In a conventional disk drive, the photo detector 706 or the laser diode 708 is generally integrated into the circuit chip and extends horizontally or vertically with respect to the disk rotating direction. Thus, the position detecting apparatus of FIGS. 4 to 6 can be integrated into the circuit chip assembly so as to detect whether the disk drive within the electronic product is placed horizontally or vertically. In addition, the conventional disk drive may include at least one circuit board that is disposed parallel to the surface defined by the rotation of a disk and that has at least one circuit chip, such as a micro controlling unit or power-control circuits. The position detecting apparatus of FIGS. 4 to 6 can be integrated into one of the circuit chips on the circuit board in order to detect whether the disk drive within the electronic product is placed horizontally or vertically.

Figure 8:
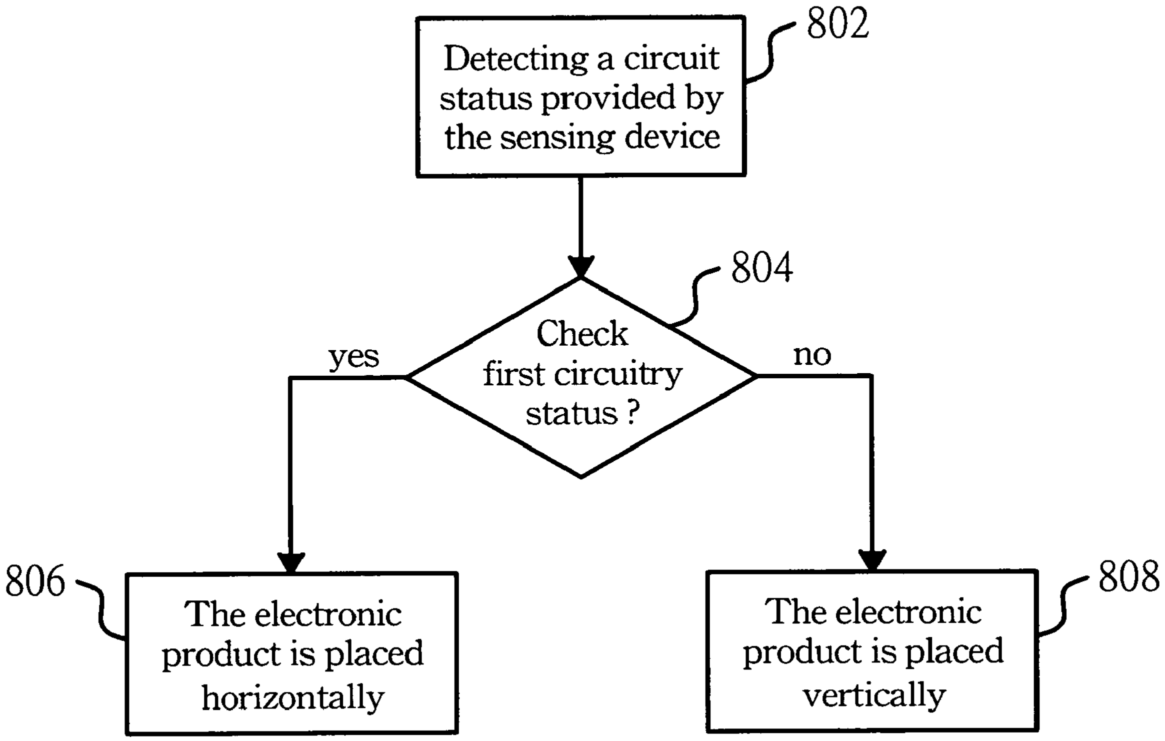
FIG. 8 shows the block diagram representing the steps in a method according to the present invention for detecting whether an electronic product being placed vertically or horizontally.

FIG. 8 shows the block diagram representing the steps of a method according to the present invention for detecting an electronic product being placed vertically or horizontally by utilizing a sensing device. The sensing device is capable of converting the distortion of a cantilever module into first and second circuitry statuses. The cantilever module includes a constraint base and a cantilever mounted on the constraint base. The method includes the steps of: step (802) detecting the circuitry status provided by the sensing device; step (804) checking out first or second circuitry status; step (806) when the first circuitry status is detected, the electronic product is currently placed horizontally; and step (808) when the second circuitry status is detected, the electronic product is currently placed vertically.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An apparatus for detecting an electronic product being placed vertically or horizontally, comprising:

a constraint base;

a fixed support member connected to said constraint base at an anchor point and extending upwardly from said constraint base;

a cantilever having a first end connected to said fixed support member so as to dispose said cantilever to be approximately parallel with said constraint base and a second end opposite to said first end;

a counterweight mounted on said second end of said cantilever in order to provide a force thereof, said counterweight defining a gravity line by virtue of ground gravity; and a sensing device for converting bending of said cantilever into a circuitry status;

wherein, when said cantilever extend in a direction approximately perpendicular to the gravity line, said sensing device converts the distortion of said cantilever into a first circuitry status, and when said cantilever extends in a direction approximately parallel to the gravity line, said sensing device converts the distortion of said cantilever into a second circuitry status different from said first circuitry status.

2. The apparatus according to claim 1, wherein said sensing device includes a resistor mounted on said cantilever for providing an initial resistance when no stress is applied thereto and another resistance when stress is applied thereto, thereby forming a resistant difference therebetween, said first circuitry status being defined when a measured resistant difference is greater than a predetermined threshold of resistant difference, said second circuitry status being defined when the measured resistant difference is smaller than or is equivalent to said predetermined threshold of resistant difference.

3. The apparatus according to claim 1, wherein said sensing device includes a first conductive member mounted on one side of said cantilever facing said constraint base and a second conductive member mounted on said constraint base in alignment with said first conductive member.

4. The apparatus according to claim 3, wherein said first circuitry status is generated when said first and second conductive members contact each other, said second circuitry status being generated when said first and second conductive members are spaced apart from each other.

5. The apparatus according to claim 3, wherein said first and second conductive members cooperatively define a capacitance therebetween, said first circuitry status being generated when a measured capacitance is greater than a predetermined threshold of capacitance, said second circuitry status being generated when the measured capacitance is equivalent to or is smaller than said predetermined threshold of capacitance.

6. A circuit chip assembly for detecting an electronic product being placed vertically or horizontally, comprising:

a base plate;

a cantilever module mounted on said base plate, and including a fixed support member connected to said base plate at an anchor point and extending upwardly from said base plate, a cantilever having a first end connected integrally to said fixed support member so as dispose said cantilever to be approximately parallel with said base plate and a second end opposite to said first end, a counterweight mounted on said second end of said cantilever in order to provide a force thereof, said counterweight defining a gravity line by virtue of ground gravity, and a sensing device for converting bending of said cantilever into a circuitry status;

wherein, when said cantilever extends in a direction approximately perpendicular to the gravity line, said sensing device converts the distortion of said cantilever into a first circuitry status, and when said cantilever extends in a direction approximately parallel to the gravity line, said sensing device converts the distortion of said cantilever into a second circuitry status different from said first circuitry status.

7. The circuit chip assembly according to claim 6, wherein said sensing device includes a resistor mounted on said cantilever for providing an initial resistance when no stress is applied thereto and another resistance when stress is applied thereto, thereby forming a resistant difference therebetween, said first circuitry status being defined when a measured resistant difference is greater than a predetermined threshold of resistant difference, said second circuitry status being defined when the measured resistant difference is smaller than or is equivalent to said predetermined threshold of resistant difference.

8. The circuit chip assembly according to claim 6, wherein said sensing device includes a first conductive member mounted on one side of said cantilever facing said base plate and a second conductive member mounted on said base plate in alignment with said first conductive member.

9. The circuit chip assembly according to claim 8, wherein said first circuitry status is generated when said first and second conductive members contact each other, said second circuitry status being generated when said first and second conductive members are spaced apart from each other.

10. The circuit chip assembly according to claim 8, wherein said first and second conductive members cooperatively define a capacitance therebetween, said first circuitry status being generated when a measured capacitance is greater than a predetermined capacitance, said second circuitry status being generated when a measured capacitance is equivalent to or is smaller than said a predetermined capacitance.

11. The circuit chip assembly according to claim 6, wherein said electronic product is an optical disk drive, and said circuit chip assembly is integrated with a laser diode.

12. The circuit chip assembly according to claim 6, wherein said electronic product is an optical disk drive, and said circuit chip assembly is integrated with a photo detector.

13. A method for detecting an electronic product being placed vertically or horizontally by utilizing a sensing device, the sensing device capable of converting the distortion of a cantilever module into first and second circuitry statuses, the cantilever module including a constraint base and a cantilever mounted on the constraint base, the method comprising the steps of:

detecting a circuitry status provided by the sensing device; and checking out if detected circuitry status is the first or the second circuitry status;

wherein when the first circuitry status is detected, the electronic product is currently placed horizontally; when the second circuitry status is detected, the electronic product is currently placed vertically.

14. The method according to claim 13, wherein the cantilever module further includes a fixed support member, said cantilever being disposed above so as to be approximately parallel with the constraint base and having a first end connected to the fixed support member and a second end opposite to the first end, the cantilever module further including a counterweight disposed on the second end of the cantilever in order to provide a force thereof.

15. The method according to claim 14, wherein said sensing device includes a resistor mounted on said cantilever for providing an initial resistance when no stress is applied thereto and another resistance when stress is applied thereto, thereby forming a resistant difference therebetween, said first circuitry status being defined when a measured resistant difference is greater than a predetermined threshold of resistant difference, said second circuitry status being defined when the measured resistant difference is smaller than or is equivalent to said predetermined threshold of resistant difference.

16. The method according to claim 15, wherein said sensing device includes a first conductive member mounted on one side of said cantilever facing said constraint base and a second conductive member mounted on said constraint base in alignment with sail first conductive member.

17. The method according to claim 16, wherein said first circuitry status is generated when said first and second conductive members contact each other, said second circuitry status being generated when said first and second conductive members are spaced apart from each other.

18. The method according to claim 16, wherein said first and second conductive members cooperatively define a capacitance therebetween, said first circuitry status being generated when a measured capacitance is greater than a predetermined threshold of capacitance, said second circuitry status being generated when the measured capacitance is equivalent to or is smaller than said predetermined threshold of capacitance.

* * * * *